United States Patent

Hamada et al.

[11] Patent Number: 5,945,043
[45] Date of Patent: Aug. 31, 1999

[54] HOLLOW SILICONE RESIN PARTICLES AND METHOD FOR THE PREPARATION THEREOF

[75] Inventors: Mitsuo Hamada; Koichi Ozaki; Toyohiko Yamadera, all of Chiba Prefecture, Japan

[73] Assignee: Dow Corning Toray Silicone Co., Ltd., Tokyo, Japan

[21] Appl. No.: 08/892,489

[22] Filed: Jul. 14, 1997

[30] Foreign Application Priority Data

Jul. 22, 1996 [JP] Japan ................................. 8-210520

[51] Int. Cl.$^6$ ........................................................ B29B 9/12
[52] U.S. Cl. .............................................. 264/12; 523/218
[58] Field of Search ................................ 264/12; 523/218

[56] References Cited

U.S. PATENT DOCUMENTS

| | | | |
|---|---|---|---|
| 2,797,201 | 6/1957 | Veatch et al. | 260/2.5 |
| 3,615,972 | 10/1971 | Morehouse | 156/79 |
| 3,975,194 | 8/1976 | Farnand et al. | 75/222 |
| 4,212,837 | 7/1980 | Oguichi et al. | 264/15 |
| 4,303,433 | 12/1981 | Torobin | 65/21.4 |
| 4,303,720 | 12/1981 | Torobin | 428/327 |
| 4,547,234 | 10/1985 | Takeuchi et al. | 149/3 |

*Primary Examiner*—Margaret W. Glass
*Attorney, Agent, or Firm*—Arne R. Jarnholm; Timothy J. Troy

[57] ABSTRACT

Novel hollow silicone resin particles, having an average particle size of 0.1 to 100 μm are disclosed. The silicone resin particles comprise a skin formed from thermoplastic silicone resin configured in the shape of a hollow capsule. The hollow thermoplastic silicone resin particles are prepared by spraying a dispersion of water and thermoplastic silicone resin dissolved in solvent into hot gas. The hot gas evaporates the solvent and water and at the same time causes solidification of the thermoplastic silicone resin while it is in the spray state, so as to form a plurality of hollow particles therefrom.

4 Claims, No Drawings

5,945,043

HOLLOW SILICONE RESIN PARTICLES AND METHOD FOR THE PREPARATION THEREOF

FIELD OF THE INVENTION

The present invention relates to hollow silicone resin particles and to a method for the preparation thereof.

DESCRIPTION OF THE PRIOR ART

Silicone rubbers and silicone resins exhibit a number of excellent characteristics, such as heat resistance, weather resistance, chemical resistance, and electrical insulating properties, and for this reason have entered into use in a variety of applications. Silicone rubber particulates and silicone resin particulates with these same excellent physical and chemical properties are already well known, but there has been nothing with regard to hollow particles beyond the suggestion in Japanese Patent Application Laid Open [Kokai or Unexamined] Number Sho 55-5787 [5,787/1980]. This reference concerns hollow solidified organopolysiloxane particles (microcapsules) prepared by mixing a gas into an ultraviolet-curable liquid organopolysiloxane composition and then effecting cure by exposing the resulting mixture to ultraviolet radiation while it is being dispersed in water by stirring. However, this reference does not describe or suggest hollow particles of thermoplastic silicone resin proper or a method for the fabrication thereof. One drawback to the hollow cured organopolysiloxane particles (microcapsules) described in this reference is that their skin is not easily ruptured even when they are dipped in solvent or heated. This prevents them, for example, from functioning as a good-quality foaming agent for the fabrication of silicone rubber sponge or silicone rubber foam.

SUMMARY OF THE INVENTION

An object of the present invention is to provide hollow silicone resin particles having a skin or shell that ruptures upon heating to furnish the expanded gas from within the capsule as a foam generator. Another object of the present invention is to provide a method for the preparation of the said hollow silicone resin particles.

In accordance with the present invention, hollow silicone resin particles having an average particle size of 0.1 to 100 μm and comprising a capsule having a skin or shell that is thermoplastic silicone resin, are produced. In the method of the invention the hollow thermoplastic silicone resin particles are produced by spraying a dispersion of water and thermoplastic silicone resin dissolved in solvent into hot gas, in order to evaporate the solvent and the water and at the same time solidify the thermoplastic resin into hollow particles while it is in the spray state.

DETAILED DESCRIPTION OF THE INVENTION

In accordance with the present invention, thermoplastic silicone resin makes up the capsule shell or wall in the hollow silicone resin particles. The interior of the capsule contains a gas such as air, nitrogen, or helium. The outside capsule diameter should average from 0.1 to 100 μm. Average diameters of 5 to 50 μm are particularly easy to fabricate. The thickness of the capsule wall will often be about 10% of the capsule diameter. While the shape is not critical, spherical shapes again are particularly easy to fabricate. The silicone resin making up the capsule of the subject hollow silicone resin particles is a thermoplastic resin: it is a solid at ambient temperature and softens and melts upon heating. Its softening point is preferably in the range from 40° C. to 200° C., based on considerations of its ultimate applications and ease of hollow particle fabrication. The silicone resin is preferably organopolysiloxane with the general formula $R_a SiO_{(4-a)/2}$ in which R represents substituted and unsubstituted monovalent hydrocarbon groups and a is a number from 0.8 to 1.8. The substituted and unsubstituted monovalent hydrocarbon groups are exemplified by alkyl such as methyl, ethyl, propyl, and butyl; aryl such as phenyl and tolyl; alkenyl such as vinyl and hexenyl; and halogenated hydrocarbon groups such as chlorophenyl and 3,3,3-trifluoropropyl. Methyl and phenyl are preferred from the standpoints of ease of acquisition, economic efficiency, and heat resistance. The subject silicone resin is exemplified by resins composed of $RSiO_{3/2}$ units; resins composed of $RSiO_{3/2}$ and $R_2 SiO_{2/2}$ units; resins composed of $R_3 SiO_{1/2}$, $RSiO_{3/2}$, and $R_2 SiO_{2/2}$ units; resins composed of $R_3 SiO_{1/2}$ and $SiO_{4/2}$ units; and resins composed of $R_3 SiO_{1/2}$, $R_2 SiO_{2/2}$, and $SiO_{4/2}$ units. Small or trace amounts of silanol, methoxy, or ethoxy may remain in the silicone resin molecule. The silicone resin should have a softening point of 40° C. to 200° C. for the following reasons: the hollow silicone resin particles have a strongly impaired storage stability at a softening point below 40° C.; at softening points above 200° C., the particles become difficult to melt and hard to manage. The preferred softening point range is 60° C. to 180° C. For the present purposes, the softening point refers to the temperature at which the silicone resin begins to flow under its own weight or under the effect of its native surface tension. This temperature is easily measured by observing the particles under a microscope while they are heated at a constant temperature.

The subject hollow silicone resin particles can be prepared simply by dissolving the thermoplastic silicone resin in a solvent; mechanically mixing or stirring the resulting solution with water to prepare a dispersion; and spraying this dispersion into a hot gas current in order to evaporate said solvent and the water and at the same time solidify the silicone resin while it is in the spray state into hollow particles.

Thus, the thermoplastic silicone resin is first dissolved in solvent to prepare a homogeneous solution of the silicone resin. Useable solvents are selected from solvents that will evaporate in the hot gas current and are incompatible or immiscible with water. Desirable solvents will have a boiling point below that of water in the 30° C. to 90° C. range. The solvent is exemplified by dichloromethane, chloroform, 1,1-dichloroethane, 1,1,1-trichloroethane, acetone, methyl ethyl ketone, and benzene.

The silicone resin solution and water are then mixed or stirred in order to prepare a dispersion. This particular step can be carried out simply using a blade-type high-speed mixer, for example, a pin mixer, turbulizer, speed mixer, or saturn mixer. The technique for spraying into a hot gas current may be any technique capable of spraying the solution into microfine liquid drops, but is not otherwise critical. The spray technique is exemplified by impinging the dispersion on a disk rotating at high speed in order to effect microparticulation and spraying by the centrifugal force; spraying the dispersion as a jet in combination with a gas; and spraying using ultrasound to microparticulate the dispersion. The preferred method, however, uses a spray nozzle generally known as a two-fluid nozzle: the dispersion is sprayed in combination with a gas and the microparticles sprayed from two directions can be collided to produce even finer particles. The spray temperature and temperature of the hot gas current in general will desirably range from room temperature up to the boiling point of water, i.e., from 40° C. to 90° C. The liquid microdrops sprayed into the hot gas current are converted into hollow silicone resin particles as a consequence of solvent evaporation as the microdrops are carried along in the hot gas stream. Between spraying of the dispersion and collection the temperature of the hot gas stream will drop due to solvent evaporation and heat losses from the system, and the flowrate and exhaust temperature of the hot gas current must be regulated so as to avoid condensation of the evaporated solvent prior to collection. When at this point entirely solid, i.e., nonhollow, silicone resin particles are mixed in with the hollow silicone resin particles, the product is preferably dipped in water containing a small amount of surfactant and the floating product is recovered. Silicone resin has a specific gravity greater than 1, but in the form of hollow particles has an apparent specific gravity less than 1 and will therefore float in water. Dissolution of surfactant in the water prevents the water from repelling the silicone resin particles. The hollow silicone resin particles will contain the gas making up the hot gas current or the gas used for spraying. Thus, the use of air, nitrogen, or helium as these gases leads to air, nitrogen, or helium, respectively, in the hollow silicone resin particles. Trace amounts of water may also be present. The water can be completely removed by heating to a temperature from 30° C. to less than 100° C. that is also below the softening point of the silicone resin.

EXAMPLES

The invention will be explained in greater detail below through working examples, in which "parts" indicates "weight parts" and "%" indicates "weight %".

Example 1

A methylphenylpolysiloxane resin, i.e., silicone resin, was dissolved in dichloromethane (bp=40° C.) to prepare a dichloromethane solution with a solids concentration of 30 weight %. The methylphenylpolysiloxane resin was composed of methylsiloxane and methylphenylsiloxane units in a 10:90 molar ratio, had a softening point of 140° C., and had a specific gravity of 1.25. This solution and pure water were fed to a dynamic mixer (pin mixer) at feed rates of 100 cc/minute and 25 cc/minute, respectively, and mixed at a blade rotation of 2,000 rpm to yield a dispersion. This dispersion was continuously sprayed using a 2-fluid nozzle into a spray dryer in which the hot gas current was nitrogen. The temperature of the hot nitrogen current was 80° C. and the pressure was 0.5 kg/cm². The collected silicone resin particles were dipped for 24 hours in an aqueous solution of 100 parts pure water and 1 part nonionic surfactant (ethylene oxide adduct of trimethylnonanol) and the floating hollow silicone resin particles were collected. The hollow silicone resin particles had an average particle size of 20 μm, an average wall thickness of 2 μm, and contained water (1% of the void volume) in addition to nitrogen. The ultimately collected hollow silicone resin particles made up 70% of the silicone resin particles, while the 30% of silicone particles that had sedimented lacked a capsule structure.

Example 2

A methylphenylpolysiloxane resin, i.e., a silicone resin, was dissolved in dichloromethane to prepare a dichloromethane solution with a solids concentration of 30 weight %. The methylphenylpolysiloxane resin was composed of methylsiloxane and methylphenylsiloxane units in a 22:78 molar ratio, had a softening point of 80° C., and had a specific gravity of 1.20. This solution and pure water were fed to a dynamic mixer as used in Example 1 at feed rates of 100 cc/minute and 25 cc/minute, respectively, and mixed at a blade rotation of 1,000 rpm to yield a dispersion. This dispersion was continuously sprayed into a spray dryer as used in Example 1. The temperature of the hot nitrogen current was 70° C. and the pressure was 0.5 kg/cm². The collected silicone resin particles were fractionated as described in Example 1 to yield nitrogen gas-containing hollow silicone resin particles with an average particle size of 40 μm and an average wall thickness of 4 μm. The ultimately collected hollow silicone resin particles made up 60% of the silicone resin particles, while the 40% of silicone particles that had sedimented lacked a capsule structure.

The hollow silicone resin particles according to the present invention are characterized by an excellent dispersibility due to their average particle size of 0.1 to 100 μm. Moreover, since they are thermoplastic, when heated to at least their softening point the capsule ruptures and the contained gas is released, which gives these particles the ability to function as a foam generator for rubber sponge and rubber foam.

The subject hollow thermoplastic silicone resin particles can be efficiently prepared by the preparative method according to the present invention.

What is claimed is:

1. A method of preparing a plurality of hollow thermoplastic silicone resin particles comprising the steps of:
   1. forming a dispersion from water and a solution comprising a thermoplastic silicone resin dissolved in a solvent; and
   2. spraying the dispersion formed in step 1 into hot gas, thereby evaporating said solvent and water and at the same time solidifying said thermoplastic silicone resin while it is in a spray state so as to form a plurality of particles comprising hollow thermoplastic silicone resin particles.

2. A method in accordance with claim 1 further comprising the steps of:
   3. immersing the plurality of particles in an aqueous surfactant solution; and
   4. collecting the hollow thermoplastic silicone resin particles that float therein.

3. The method of claim 2, wherein trace amounts of water are present in the hollow thermoplastic silicone resin particles collected in step 4, and wherein the method further comprises step 5, heating the particles to a temperature from 30 to less than 100° C., with the proviso that the temperature is below that temperature required to soften the thermoplastic silicone resin, thereby removing the water.

4. The method of claim 1, wherein the hot gas is selected from the group consisting of air, helium, and nitrogen.

* * * * *